R. F. SCOTT.
GRAPPLE.
APPLICATION FILED JAN. 31, 1910.

973,709.

Patented Oct. 25, 1910.
2 SHEETS—SHEET 1.

WITNESSES:

INVENTOR
Robert F. Scott
BY
Charles N. Butler
ATTORNEY.

UNITED STATES PATENT OFFICE.

ROBERT F. SCOTT, OF PHILADELPHIA, PENNSYLVANIA, ASSIGNOR TO EDWIN HARRINGTON, SON & CO., INC., OF PHILADELPHIA, PENNSYLVANIA, A CORPORATION OF PENNSYLVANIA.

GRAPPLE.

973,709.          Specification of Letters Patent.        Patented Oct. 25, 1910.

Application filed January 31, 1910. Serial No. 541,052.

*To all whom it may concern:*

Be it known that I, ROBERT F. SCOTT, a citizen of the United States, residing in the city of Philadelphia, county of Philadelphia, and State of Pennsylvania, have invented an Improved Grapple, of which the following is a specification.

This invention is a grapple designed primarily for use in handling ammunition. Its leading object is to provide improved means for quickly and securely grappling shells. In its preferred construction it comprises a pair of pivotally connected jaws, a threaded strut pivotally connected to a member of one of the jaws, a bearing member adapted to be screwed upon the strut into and out of thrusting engagement with a member of the other jaw, a block engaged by the pintle connecting the jaws and adapted for preventing them from closing, and a swivel engaging the block and adapted for engagement with a hoisting mechanism.

Figures 1, 2:
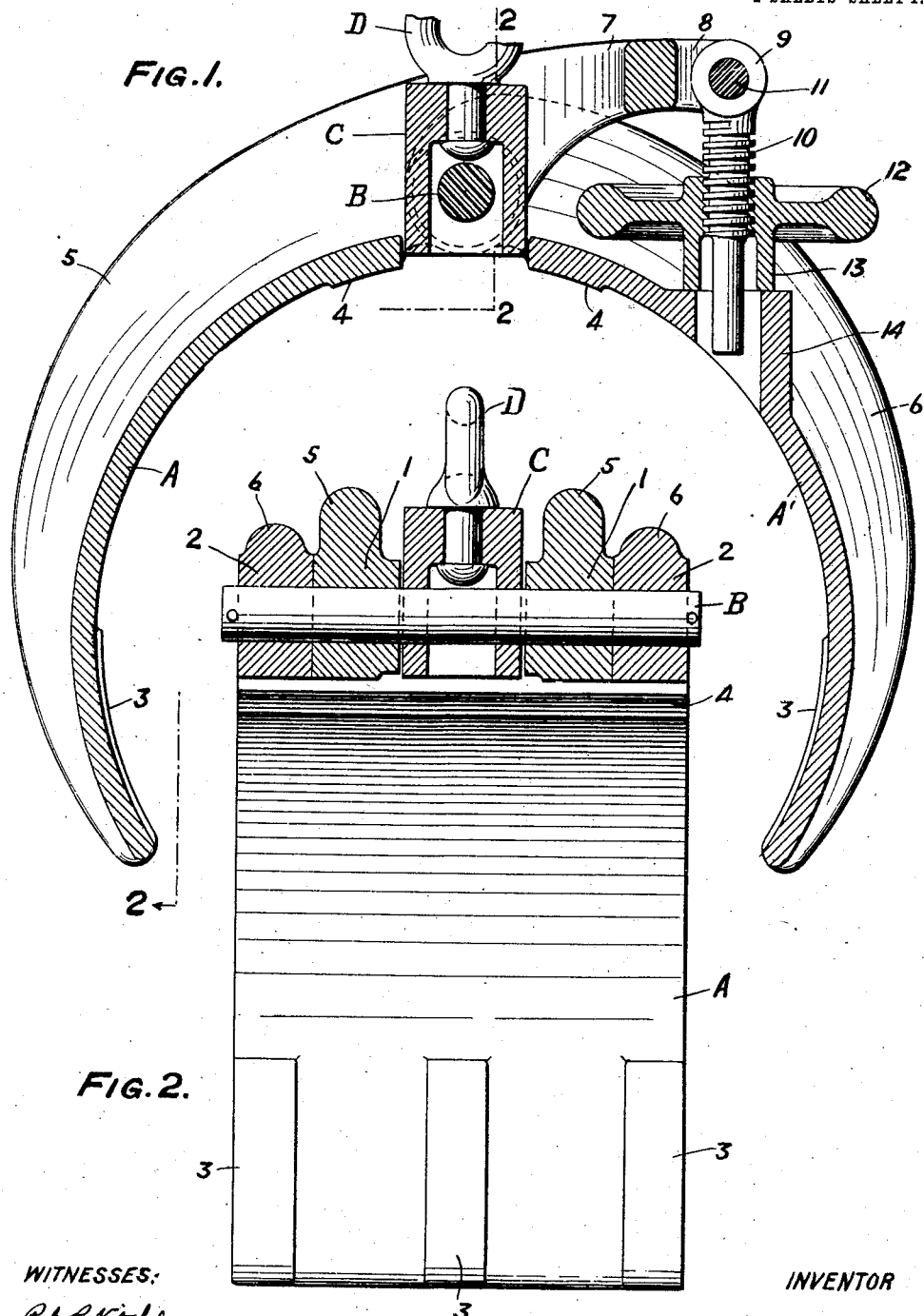
Figure 3:
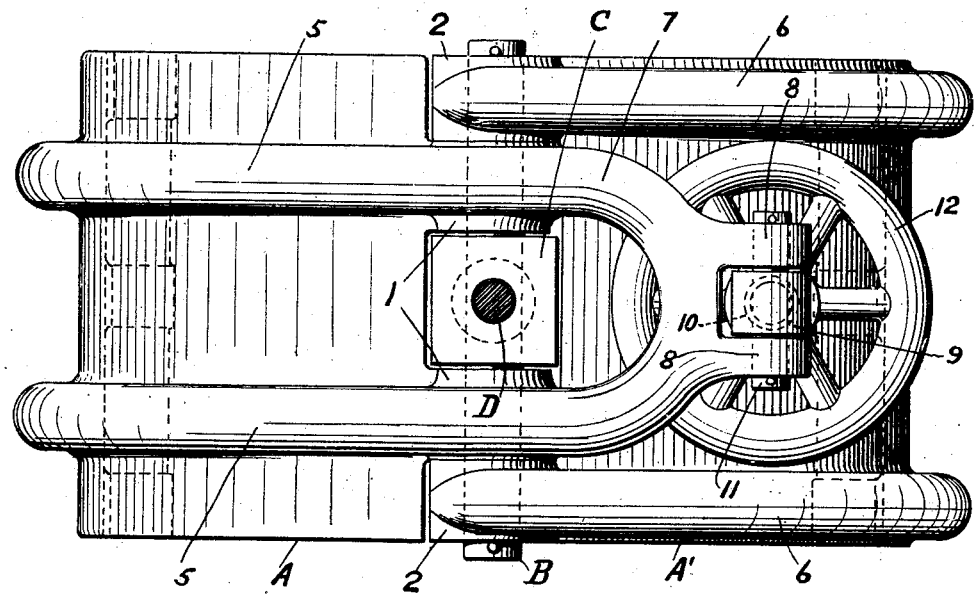
Figure 4:
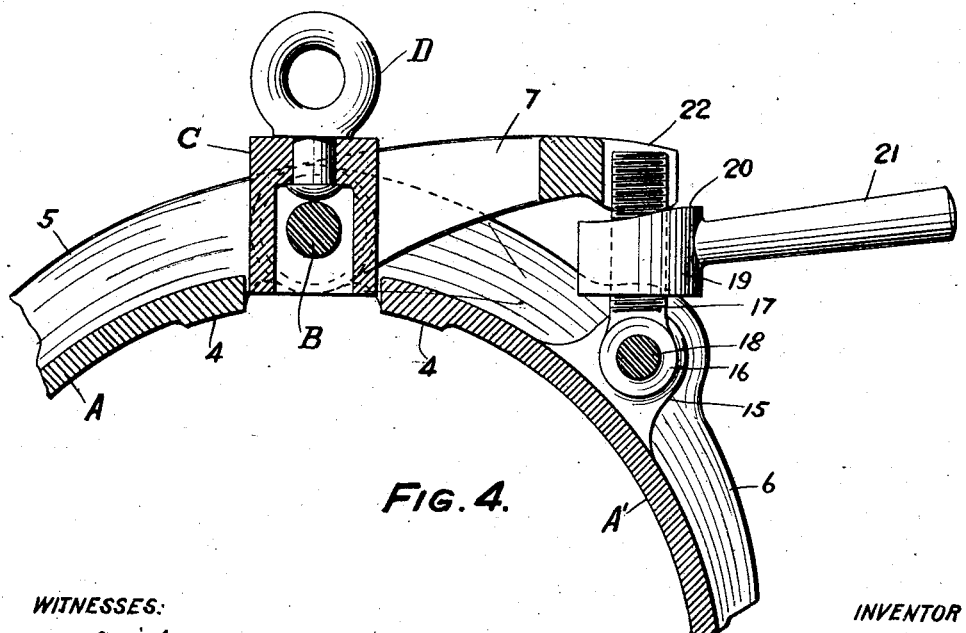

In the drawings, Figure 1 is a sectional side elevation of a grapple embodying my invention; Fig. 2 is a sectional view of the same taken on the line 2—2 of Fig. 1; Fig. 3 is a top plan view of the same; and Fig. 4 is a sectional side elevation representing modifications in the details of construction.

The grapple comprises the jaws A and A' provided with the respective hinge bearings or knuckles 1 and 2 through which is passed the pintle B for connecting them; the pintle also passing through the block C which is disposed between the parts 1 and is engaged by the swivel D. The swivel block, being disposed between the jaws, also serves to prevent them from collapsing or closing beyond the desired limit.

The respective jaws have within the cylindrical segments forming their bodies the inwardly projecting contact or bearing parts 3 and 4 and without the cylindrical segments the reinforcing ribs 5 and 6, the ribs 5 being extended and joined to form a bifurcated arm 7.

In the preferred construction, shown in Figs. 1 to 3 inclusive, hinge bearings or knuckles 8 are formed on the arm 7, between which is disposed the bearing 9 of a threaded strut 10, and a pintle 11 is passed through these bearings to provide a pivotal connection of the strut with the arm. A hand wheel 12 is screwed on the strut 10 and has the hub 13 which engages the bearing 14 of the jaw A' through which the lower end of the strut 10 is freely movable.

It will be understood that when the wheel is moved up on the strut the jaws can be moved farther apart and when the wheel is moved down the jaws are forced together so as to grip the body which they are designed to hold.

In the construction shown in Fig. 4, the jaw A' has bearing members 15 formed thereon, with which the bearing member 16 of the threaded strut 17 is pivotally connected by the pintle 18. A hub or nut 19, having the cam surface 20, is provided with the arm 21 by which it is turned on the strut, the cam surface engaging the bearings 22 on the arm 7 between which the upper end of the strut is freely movable.

It will be understood that a half turn of the cam nut in opposite directions clamps and unclamps the jaws.

Having described my invention, I claim:

1. In a grapple, a pair of pivotally connected jaws, an arm fixed to one of said jaws, a bearing on the other of said jaws, and means, comprising a strut and a hub adapted to turn thereon acting between said arm and bearing for closing said jaws.

2. In a grapple, a pair of pivotally connected jaws, an arm fixed on one of said jaws, a bearing member on the other of said jaws, a threaded strut pivotally connected to said arm and movable freely through said bearing member, and a bearing member revoluble on said strut between said arm and bearing member first named for engaging the latter and closing said jaws.

3. In a grapple, a pair of jaws, a swivel block, a pintle connecting said jaws and block, an arm on one and a bearing member on the other of said jaws, a threaded strut pivotally connected to said arm, and a wheel having a hub revoluble on said strut between said arm and bearing member, said hub engaging said bearing member to close said jaws.

In witness whereof I have hereunto set my name this 28th day of January, 1910, in the presence of the subscribing witnesses.

ROBT. F. SCOTT.

Witnesses:
   Z. B. COES,
   A. M. HARRINGTON.